US009124351B2

(12) United States Patent
Uchimura et al.

(10) Patent No.: US 9,124,351 B2
(45) Date of Patent: Sep. 1, 2015

(54) SEMICONDUCTOR DEVICE, RADIO COMMUNICATION TERMINAL USING THE SAME, AND CONTROL METHOD

(75) Inventors: Yutaka Uchimura, Tokyo (JP); Takahiro Irita, Tokyo (JP); Noriaki Sakamoto, Tokyo (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 172 days.

(21) Appl. No.: 13/589,157

(22) Filed: Aug. 19, 2012

(65) Prior Publication Data

US 2013/0053111 A1 Feb. 28, 2013

(30) Foreign Application Priority Data

Aug. 30, 2011 (JP) ................. 2011-187039

(51) Int. Cl.
*H04M 1/00* (2006.01)
*H04B 1/40* (2015.01)
*H04M 1/02* (2006.01)
*G10L 19/16* (2013.01)

(52) U.S. Cl.
CPC . *H04B 1/40* (2013.01); *G10L 19/16* (2013.01); *H04M 1/026* (2013.01); *H04M 1/0214* (2013.01)

(58) Field of Classification Search
CPC . H04M 1/0202; G10L 19/24; G10L 19/0019; G10H 7/004

USPC ...................... 455/572, 550.1, 440
See application file for complete search history.

(56) References Cited

U.S. PATENT DOCUMENTS

| 6,493,326 | B1* | 12/2002 | Ramachandran ............. 370/311 |
| 7,720,046 | B2* | 5/2010 | Chen et al. ..................... 370/350 |
| 7,787,529 | B2* | 8/2010 | Cheng et al. .................. 375/220 |
| 7,912,728 | B2* | 3/2011 | Kong et al. .................... 704/500 |
| 7,962,171 | B2* | 6/2011 | Fu et al. ..................... 455/552.1 |
| 8,554,197 | B2* | 10/2013 | Rabii ............................ 455/423 |
| 2008/0140871 | A1* | 6/2008 | Park et al. ...................... 710/14 |
| 2010/0317397 | A1* | 12/2010 | Sinai ......................... 455/550.1 |
| 2012/0314693 | A1* | 12/2012 | Medapalli et al. ............ 370/338 |

FOREIGN PATENT DOCUMENTS

JP 2000-148582 A 5/2000

* cited by examiner

*Primary Examiner* — William Nealon
(74) *Attorney, Agent, or Firm* — Miles Stockbridge P.C.

(57) ABSTRACT

A communication terminal according to one aspect of the present invention includes a baseband LSI that performs baseband processing for communication, an application LSI that includes a vocoder function and performs processing according to an application, an audio LSI that performs one of D/A conversion and A/D conversion on audio data, and a switch circuit that is installed in the application LSI and connects a data path between the audio processor LSI and the baseband LSI.

18 Claims, 15 Drawing Sheets

SEMICONDUCTOR DEVICE, RADIO COMMUNICATION TERMINAL USING THE SAME, AND CONTROL METHOD

CROSS-REFERENCE TO RELATED APPLICATIONS

This application is based upon and claims the benefit of priority from Japanese patent application No. 2011-187039, filed on Aug. 30, 2011, the disclosure of which is incorporated herein in its entirety by reference.

BACKGROUND

The present invention relates to a semiconductor device, a radio communication terminal using the semiconductor device, and a control method.

In recent years, communication terminals using vocoders (vocoders) have been used. For example, in Japanese Unexamined Patent Application Publication No. 2000-148582, vocoders having different rates are switched to be used according to the state of lines.

The inventors of this application have found various problems to be solved in the development of semiconductor devices used for communication terminals and the like. Each embodiment disclosed in this application provides, for example, a semiconductor device suitable for a communication terminal and the like. More detailed features will be obvious from descriptions of this specification and attached drawings.

SUMMARY

An aspect disclosed in this specification includes a semiconductor device, and the semiconductor device is used as an application processor unit in a communication terminal.

According to the present invention, it is possible to provide an excellent semiconductor device, a communication terminal, and a control method of the communication terminal.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

First Embodiment

Specific embodiments to which the present invention is applied are explained hereinafter in detail with reference to the drawings. However, the present invention is not limited to the embodiments shown below. Further, the following descriptions and the drawings are simplified as appropriate for clarifying the explanation.

Figure 1A:
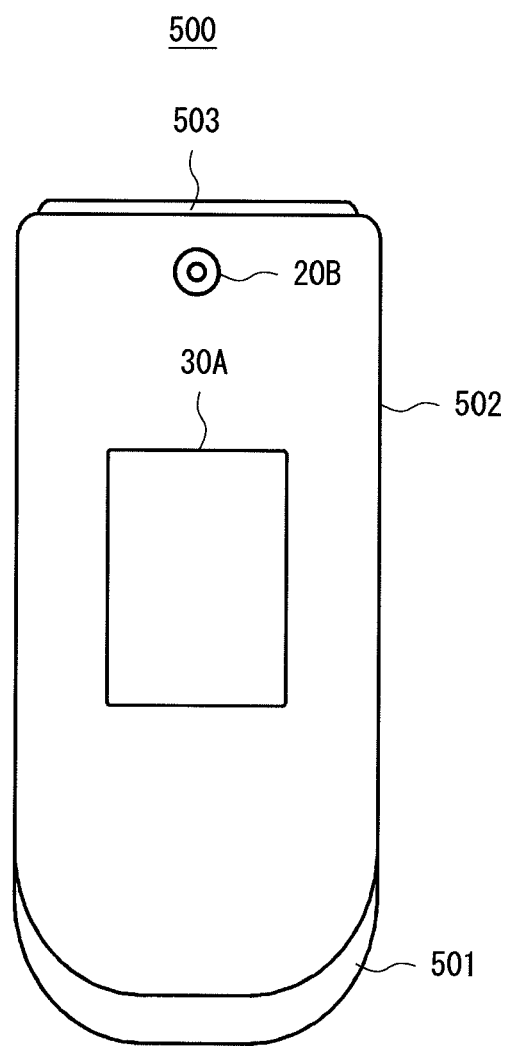
FIG. 1A is an external view showing a configuration example of a radio communication terminal 500.
Figure 1B:
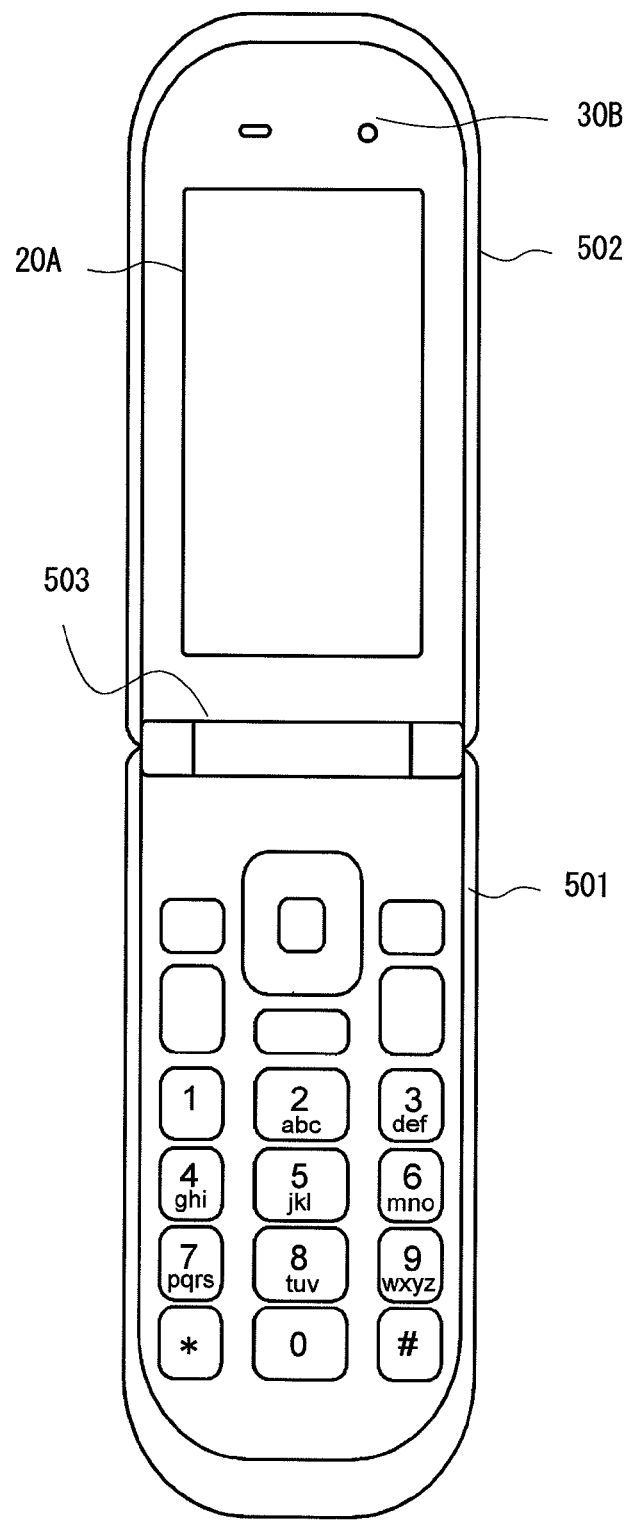
FIG. 1B is an external view showing a configuration example of the radio communication terminal 500.
Figure 2:
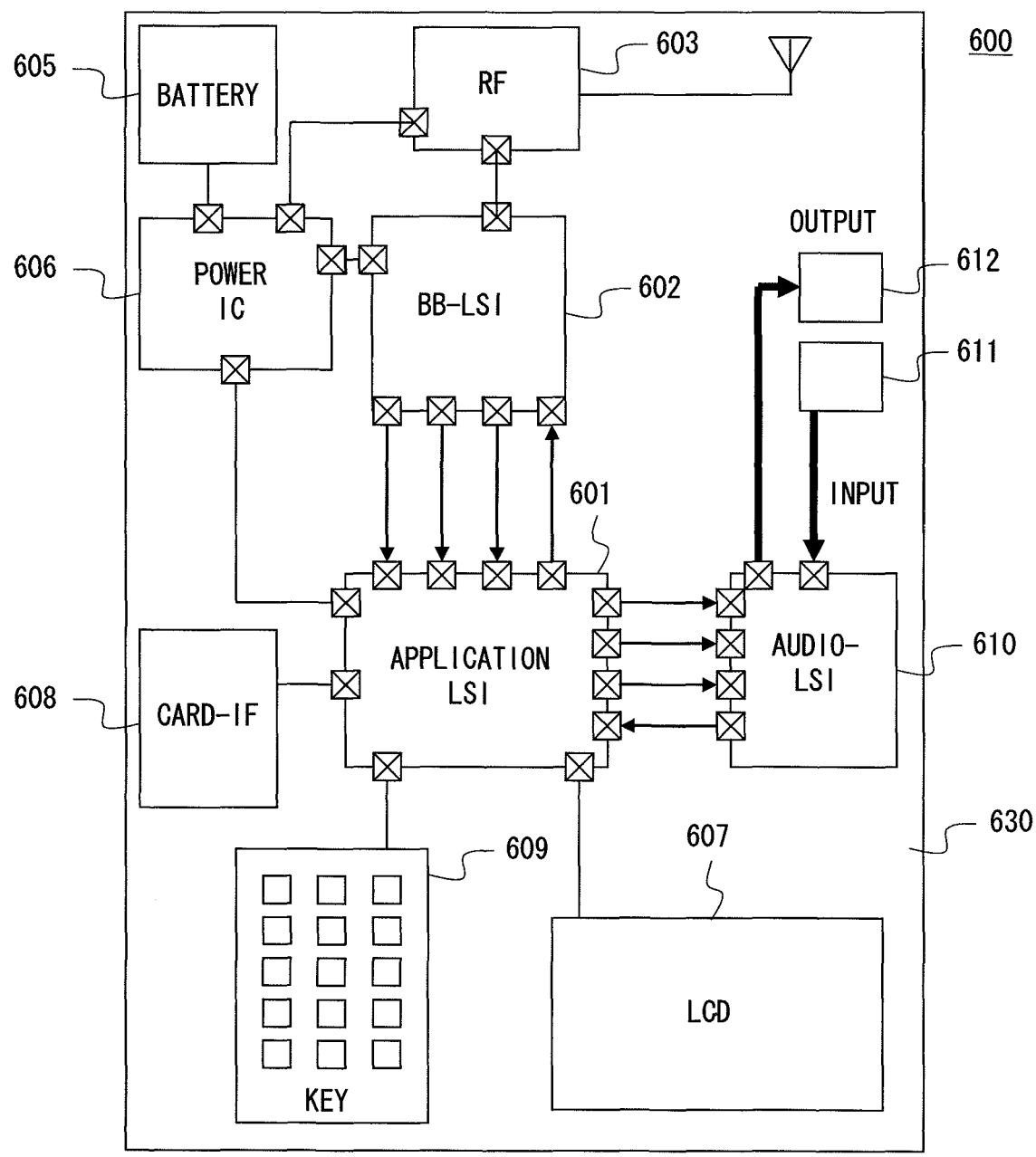
FIG. 2 is a block diagram showing a configuration example of an electronic device 600 according to a first embodiment.

First, with reference to FIGS. 1A, and 1B, an outline of a radio communication terminal, which is a preferable electronic device to which a semiconductor device according to this embodiment is applied, is explained. FIGS. 1A and 1B are external views showing a configuration example of a radio communication terminal 500. Note that the configuration example shown in FIGS. 1A, 1B and 2 shows a case where the radio communication terminal 500 is a folding-type mobile phone terminal. However, the radio communication terminal 500 may be other radio communication terminals such as a smart phone, a potable game terminal, a tablet PC (Personal Computer), and a laptop PC. Further, needless to say, the semiconductor device according to this embodiment may also be applied to devices other than the radio communication terminals.

FIG. 1A shows a closed state (folded state) of the radio communication terminal 500 which is a folding-type mobile phone terminal. FIG. 1B shows an opened state of the radio communication terminal 500. The radio communication terminal 500 has such a structure that a first housing 501 is connected to a second housing 502 through a hinge 503. In the example shown in FIGS. 1A and 1B, a plurality of buttons are arranged on the first housing 501. Meanwhile, the second housing 502 includes two display devices 20A and 30A and two camera devices 20B and 30B. Each of the display devices 20A and 30A is an LCD (Liquid Crystal Display), an OLED (Organic Light-Emitting Diode) display, or the like.

The display device 20A is disposed in such a manner that its display surface is positioned on the inside main surface (front surface) of the second housing 502. That is, the display device 20A is a main display that is viewed by a user when the user operates the radio communication terminal 500 in an opened state. On the other hand, the display device 30A is a sub display that is disposed in such a manner that its display surface is positioned on the outside main surface (rear surface) of the second housing 502.

The camera device 20B is a main camera that is disposed in such a manner that its lens unit is positioned on the outside main surface (rear surface) of the second housing 502. On the other hand, the camera device 30B is a sub camera that is disposed in such a manner that its lens unit is positioned on the inside main surface (front surface) of the second housing 502.

Next, with reference to FIG. 2, a configuration of an electronic device 600 in which a semiconductor device according to the present invention is installed is explained. FIG. 2 is a block diagram showing a configuration example of the electronic device 600 according to a first embodiment of the present invention. The electronic device 600 is installed, for example, inside the radio communication terminal 500 shown in FIGS. 1 and 1B. As shown in FIG. 2, the electronic device 600 includes an application LSI (Large Scale Integration) 601, a baseband LSI 602, an RF (Radio Frequency) subsystem 603, a battery 605, a power IC (Integrated Circuit) 606, an LCD 607, an operation input unit 609, an audio LSI 610, a microphone 611, a speaker 612, and a card IF (Interface) 608. These elements are mounted on a board 630.

The application LSI 601 includes a processor unit that performs processing of reading out a program stored in a memory 604 (not shown in FIG. 2) to implement various functions of the electronic device 600. For example, the application LSI 601 executes an OS (Operating System) program obtained from the memory and also executes application programs that are executed on this OS program. Note that the memory stores programs and data that are used by the application LSI 601. Further, the memory includes a non-volatile memory which retains stored data even when the power supply is cut off and a volatile memory in which stored data is cleared when the power supply is cut off.

The baseband LSI 602 includes a processor unit that performs baseband processing. For example, the baseband LSI 602 performs an encoding process (e.g., error correction coding such as convolution coding and turbo coding) or a decoding process for data to be transmitted/received by the electronic terminal 600. More specifically, the baseband LSI 602 receives transmission data from the application LSI 601, performs an encoding process for the received transmission data, and transmits the encoded transmission data to the RF subsystem 603. Further, the baseband LSI 602 receives reception data from the RF subsystem 603, performs a decoding process for the received reception data, and transmits the decoded reception data to the application LSI 601.

The RF subsystem 603 performs a modulation process or a demodulation process for data to be transmitted/received by the electronic device 600. More specifically, the RF subsystem 603 generates a transmission signal by modulating transmission data received from the baseband LSI 602 by a carrier wave, and outputs the transmission signal through an antenna. Further, the RF subsystem 603 receives a reception signal through an antenna, generates reception data by demodulating the reception signal by a carrier wave, and transmits the reception data to the baseband LSI 602.

The battery 605 is an electric battery and is used when the electronic device 600 operates without using any external power supply. Note that the electronic device 600 may use the battery 605 even when the external power supply is connected. Further, it is preferable that a secondary battery is used as the battery 605.

The power IC 606 is a power management IC that generates an internal power supply from the battery 605 or the external power supply. This internal power supply is supplied to each block of the electronic device 600. Note that the power IC 606 controls the voltage of the internal power supply for each of the blocks that receive the internal power supply. The power IC 606 controls the voltage of the internal power supply under instructions from the application LSI 601. Further, the power IC 606 can also control whether the internal power supply is supplied or cut off for each of the blocks. Further, when the external power supply is supplied, the power IC 606 controls the charging to the battery 605.

The LCD 607 is, for example, a display device, and displays various images according to the process performed in the application LSI 601. The images displayed in the LCD 607 include user interface images through which a user gives instructions to the electronic device 600, camera images, moving images, and the like. As a matter of course, display devices other than the LCD 607 may be used instead.

The operation input unit 609 is a user interface which is operated by a user and through which the user gives instructions to the electronic device 600. While key buttons are shown as an example of the operation input unit 609, a touch panel may be used instead. The audio LSI 610 is an audio processor unit that decodes audio data transmitted from the application LSI 601 to drive the speaker 612, and encodes audio information obtained from the microphone 611 to generate the audio data, to output the audio data to the application LSI 601. Thus, the audio LSI 610 is a processor unit that includes a D/A converter and an A/D converter. Lines to connect the aforementioned configurations are formed in the board 630.

Next, problems in the vocoder system that are found as a result of study by the inventors will be described. It should be noted that the term "vocoder" is used to collectively indicate processing including decoder/encoder for telephone call in a communication terminal. In short, the vocoder is a technique of audio processing, and aims to execute encoding of compressed data such as AMR and decoding of PCM data. The vocoder is required for performing voice call, reproduction of voice guidance, and recording. In the vocoder system, a C-vocoder system in which the baseband LSI 602 executes elements required for the vocoder is used. Further, the C-vocoder system includes two methods of a method of executing elements (telephone call, recording, guidance reproduction, and the like) required for the vocoder only by the baseband LSI 602 as shown in FIG. 3 (hereinafter referred to as a method 1) and a method of executing a part of the elements required for the vocoder by the baseband LSI 602 as shown in FIG. 4 (hereinafter referred to as a method 2).

Figure 3:
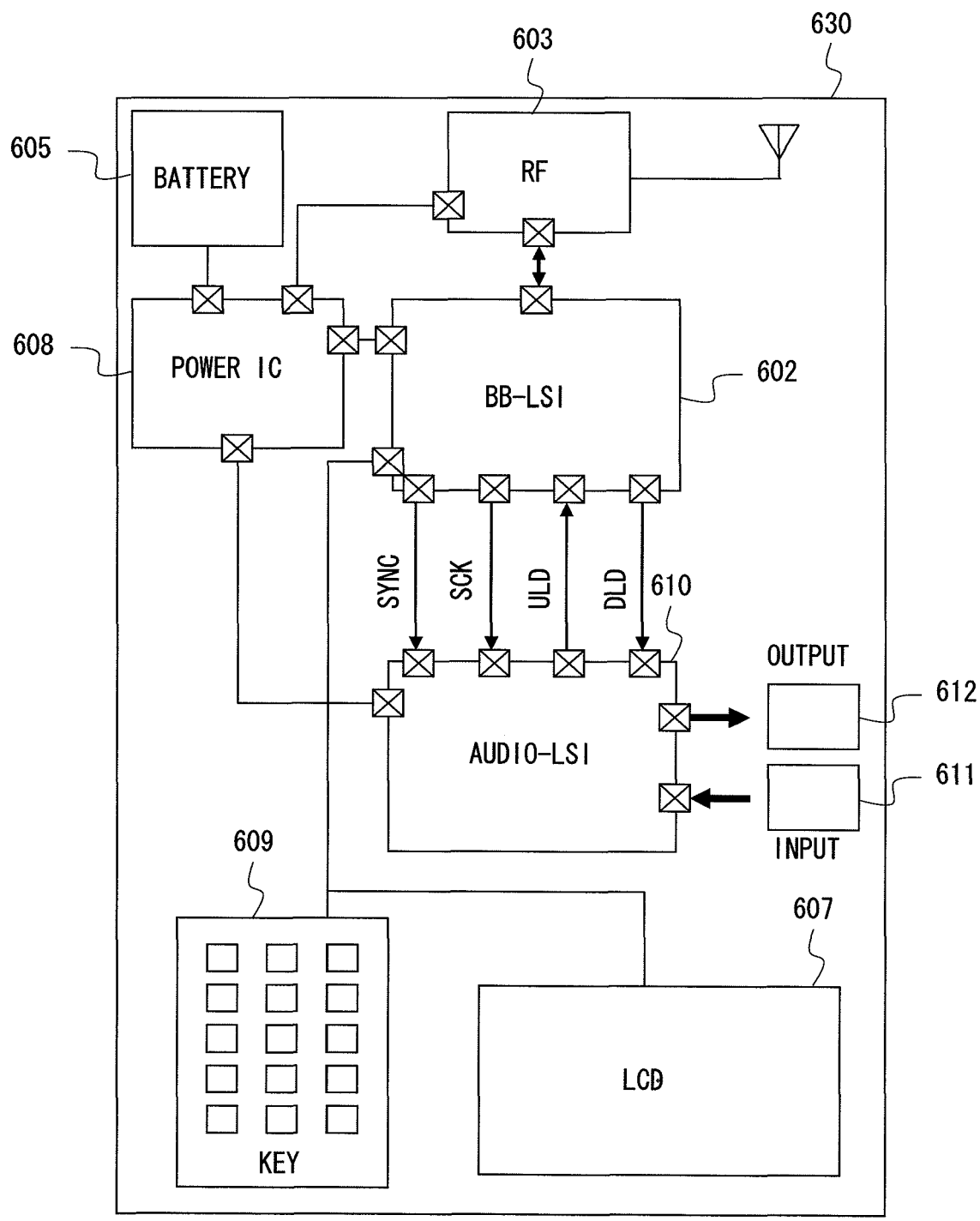
FIG. 3 is a block diagram showing a configuration of an electronic device according to a method 1.
Figure 4:
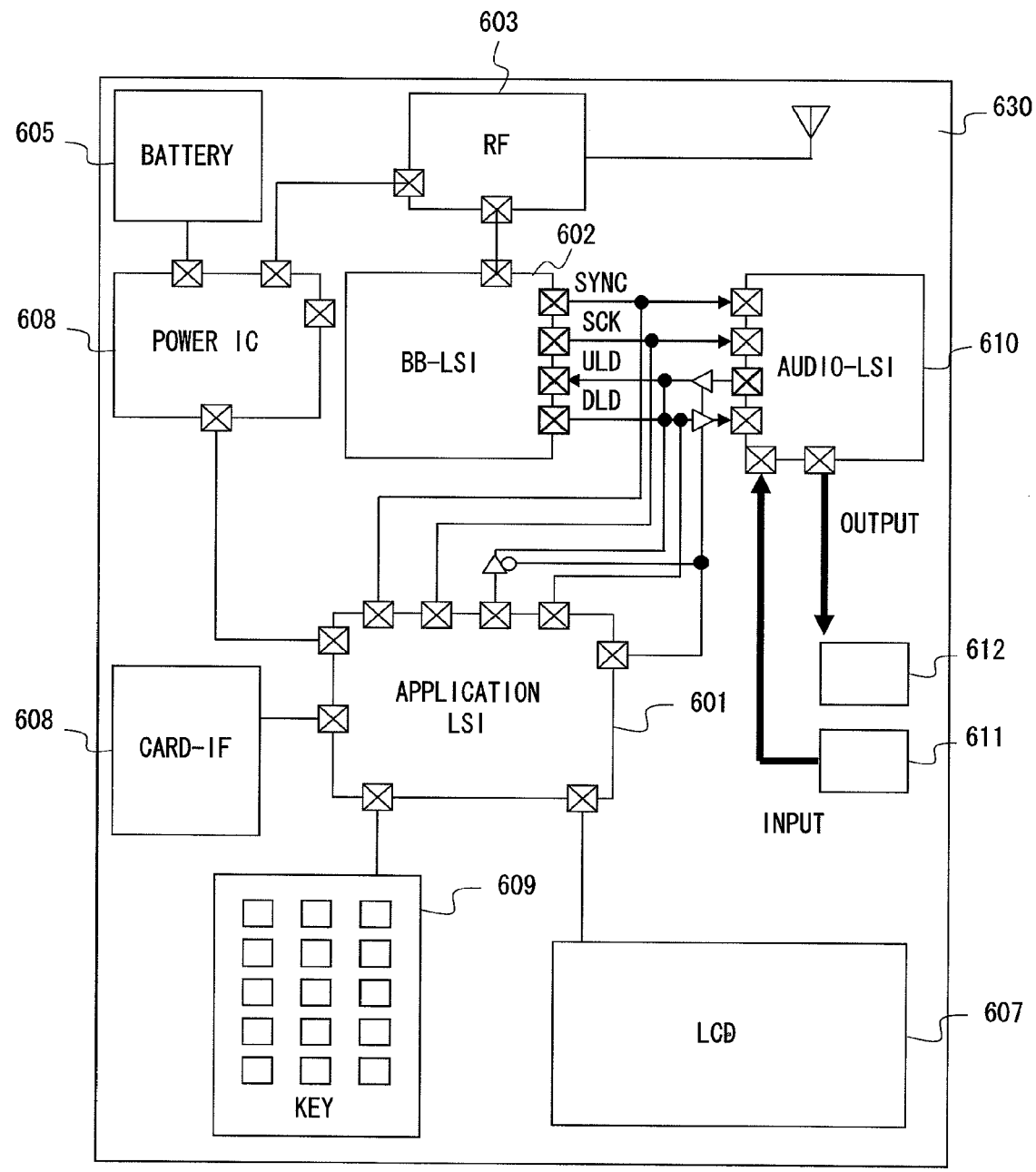
FIG. 4 is a block diagram showing a configuration of an electronic device according to a method 2.

In the method 1 shown in FIG. 3, the baseband LSI 602 executes all the audio data processing. Specifically, the baseband LSI 602 extracts data (e.g., AMR data) required for voice call from the reception data demodulated by the RF subsystem 603, to decode the extracted data to the PCM data. The baseband LSI 602 outputs the PCM data to the audio LSI 610. The audio LSI 610 converts the PCM data into the analog signal, to allow voice to be reproduced from the speaker 612 (Down Link). Note that the AMR data is compressed data, and the PCM data is non-compressed data.

On the other hand, the audio LSI 610 performs A/D conversion on the analog signal of the voice detected by the microphone 611 to generate the PCM data. The audio LSI 610 outputs the PCM data to the baseband LSI 602. The baseband LSI 602 encodes the PCM data to the form such as AMR to convert the form into a form that allows the RF subsystem 603 to receive the data. For example, the baseband LSI 602 adds information required for the radio communication to output the information to the RF subsystem 603. Then the RF subsystem 603 modulates the signal and sends the modulated signal to Air from the antenna (Up Link). In this way, transmission processing for voice call is performed. In addition, the baseband LSI 602 executes effect processing on the PCM data, and guidance reproduction, memo recording and the like that do not involve communication.

Figure 5:
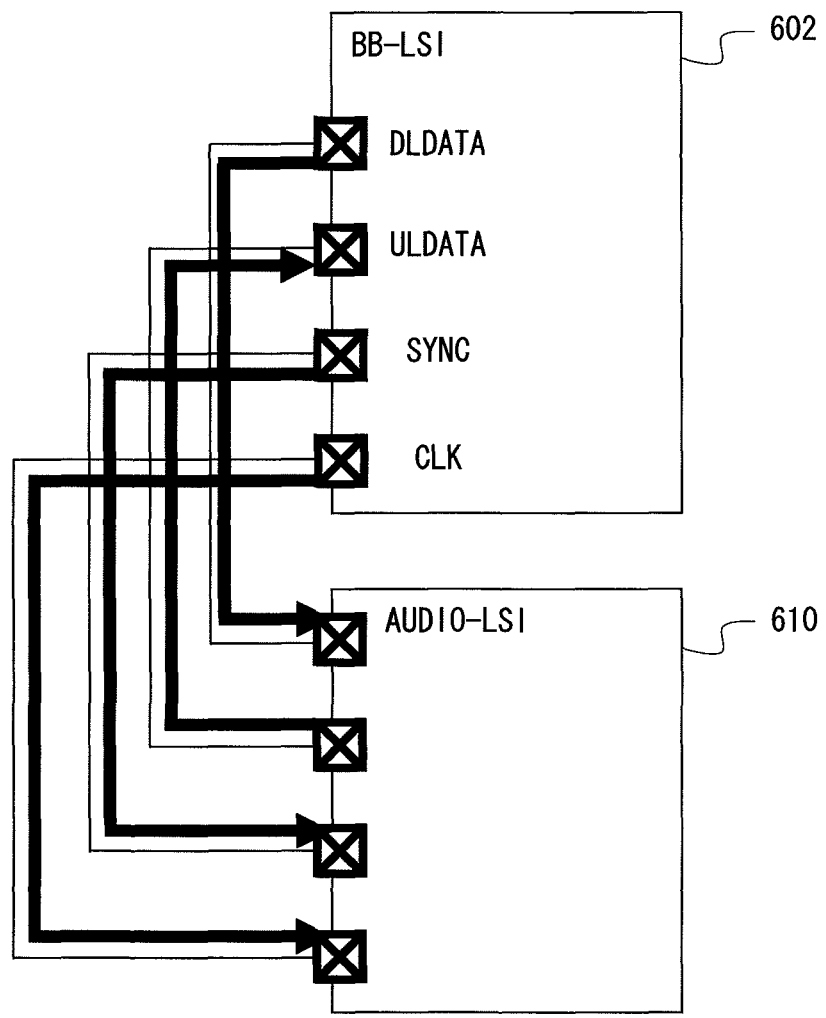
FIG. 5 is a diagram showing a data flow of the electronic device according to the method 1.

According to the method 1, as shown in FIG. 5, data regarding audio processing (in FIG. 5, DLDATA, ULDATA, SYNC, CLK, and hereinafter referred to as audio processing data) is transmitted between the baseband LSI 602 and the audio LSI 610. FIG. 5 is a diagram schematically showing a data flow of the audio processing data. Accordingly, terminals of the baseband LSI 602 and terminals of the audio LSI 610 are directly connected through the lines on the board 630.

Incidentally, there is a request to cause the application LSI 601 to execute elements of the vocoder. In particular, voice quality is expected to be improved in the LTE (Long Term Evolution) by causing the application LSI 601 to execute the elements of the vocoder. In this case, as shown in the method 2 in FIG. 4, such a configuration is employed in which the application LSI 601 is mounted on the board 630. In the C-vocoder according to the method 2, such a configuration may be employed in which a part of the elements (e.g., guidance reproduction, recording) of the vocoder is performed by the application LSI 601, and the rest of the elements (e.g., voice call) are performed by the baseband LSI 602. Note that the LTE is a communication standard specified by the 3GPP standards body.

In the method 2, as is different from FIG. 2, lines connecting the baseband LSI 602 and the audio LSI 610 are formed on the board 630. In short, in FIG. 2, while the lines from the application LSI 601 to the baseband LSI 602 and the lines from the application LSI 601 to the audio LSI 610 are formed, lines that directly connect the baseband LSI 602 and the audio LSI 610 are not formed. Meanwhile, in FIG. 4, lines that directly connect the baseband LSI 602 and the audio LSI 610 are formed on the board 630.

Figure 6:
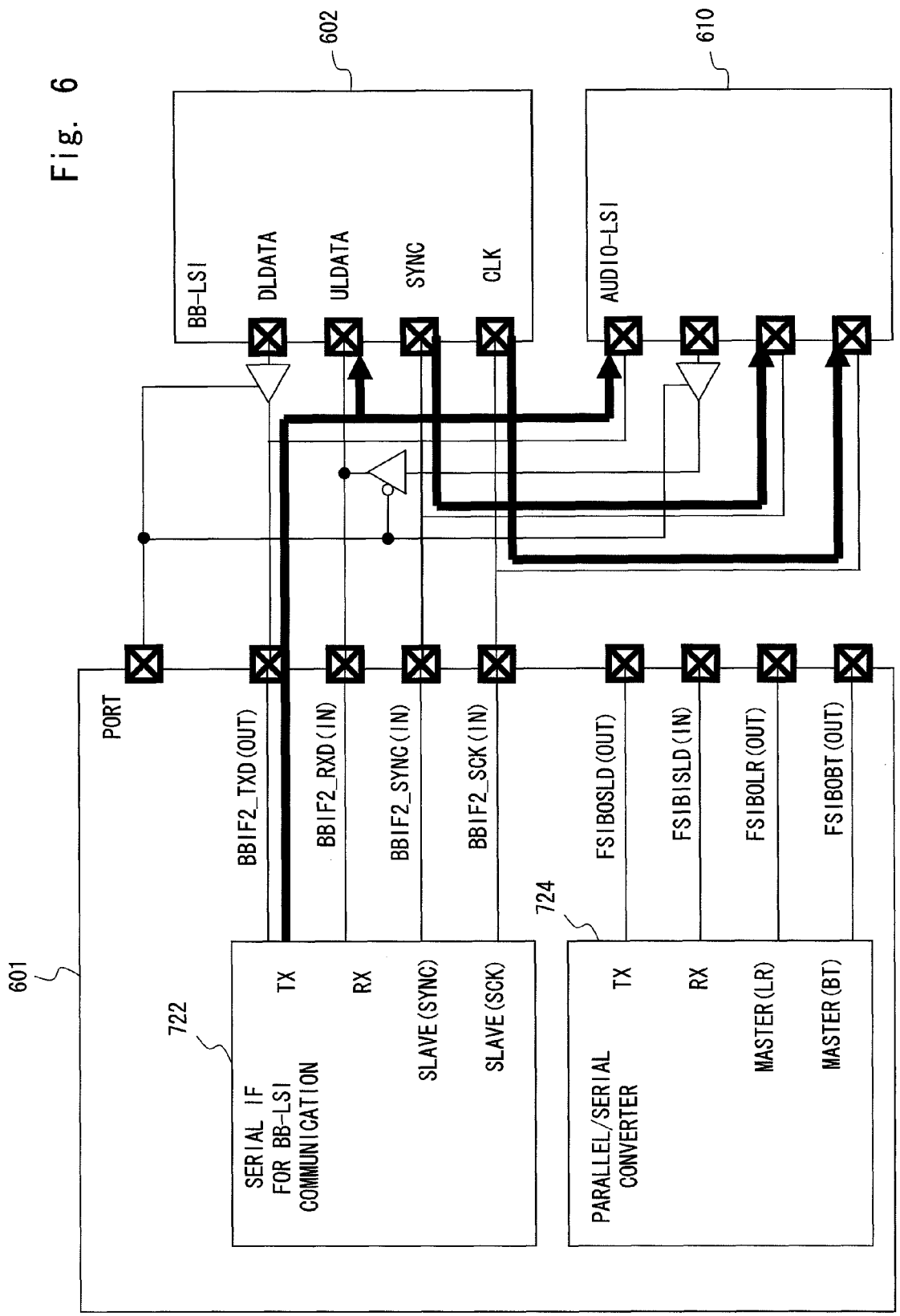
FIG. 6 is a diagram showing a data flow of the electronic device according to the method 2.

FIG. 6 shows a data flow of the audio processing data according to the method 2 shown in FIG. 4. FIG. 6 is a diagram schematically showing the data flow when guidance is reproduced, for example. In the method 2, the audio LSI 610 is required to transmit the audio processing data to the application LSI 601 or the baseband LSI 602. When the guidance reproduction or recording is performed, the application LSI 601 executes vocoding. In this case, the audio processing data from the audio LSI 610 is transmitted to the application LSI 601. On the other hand, when the voice call is performed, the baseband LSI 602 executes vocoding. In this case, the audio processing data from the audio LSI 610 is directly transmitted to the baseband LSI 602. In this case, the data flow is the same to that shown in FIG. 5. A data flow in which the audio processing data is directly transmitted between the baseband LSI 602 and the audio LSI 610 and a data flow in which the audio processing data is transmitted through the processing in the application LSI 601 are mixed in one electronic device 600.

The inventors of the present application consider that the data flow from the baseband LSI 602 is required to be switched from the application LSI 601 to the audio LSI 610 when the application LSI 601 executes a part of the elements of the vocoder. In short, it is required to provide a component to connect lines from the baseband LSI 602 to the audio LSI 610 and the application LSI 601, and to switch the path on the board 630. In other words, one example to switch the path may be a method of providing a switch circuit on the board to switch the data flow between the baseband LSI 602 and the application LSI 601 and the data flow between the baseband LSI 602 and the audio LSI 610. Then, it is possible to switch data flow according to the control signal from Port of the application LSI 601. This is because there is no need to re-design the application LSI 601, which allows easier manufacturing.

In order to achieve higher functionality and to further improve quality, employment of an A-vocoder is desired in which the application LSI 601 executes all the digital processing (decoding to PCM data, encoding to AMR data, noise canceller, echo canceller, SRC processing, improvement in voice quality and the like) except packet separation from the RF subsystem 603 among the processing in the telephone call, to output final audio data to the audio LSI 610. In particular, it is expected that, in the LET generation, the voice call is also regarded as one application, and the vocoder is more likely to be treated as a part of the application. It is expected that transition from the C-vocoder system to the A-vocoder system will gradually advance in order to improve quality of voice call. It is also considered that, in the transition period from the current C-vocoder system to the A-vocoder system, both of the C-vocoder system and the A-vocoder system will be used. In short, it is required to determine which system to employ according to the manufacturer of communication terminals and the type of the communication terminal.

Incidentally, there is a demand to commonly use the board 630 in various types of communication terminals, in particular mobile phones. In short, it is desired to achieve the configuration in which both of the A-vocoder and the C-vocoder can be achieved on one board. However, it is difficult to commonly use the board both in the A-vocoder system and the C-vocoder system of the method 2. For example, since it is required to minimize the size of each equipment, the mounting rate in a board has been maximally enhanced. Accordingly, it may be difficult to secure the space to additionally mount the switch circuit in some systems, which may require another board. In other words, when the board is commonly used in the A-vocoder system and the C-vocoder system, the switch circuit required for the C-vocoder system is not required in the A-vocoder system, which imposes strict restrictions on the design.

Figure 7:
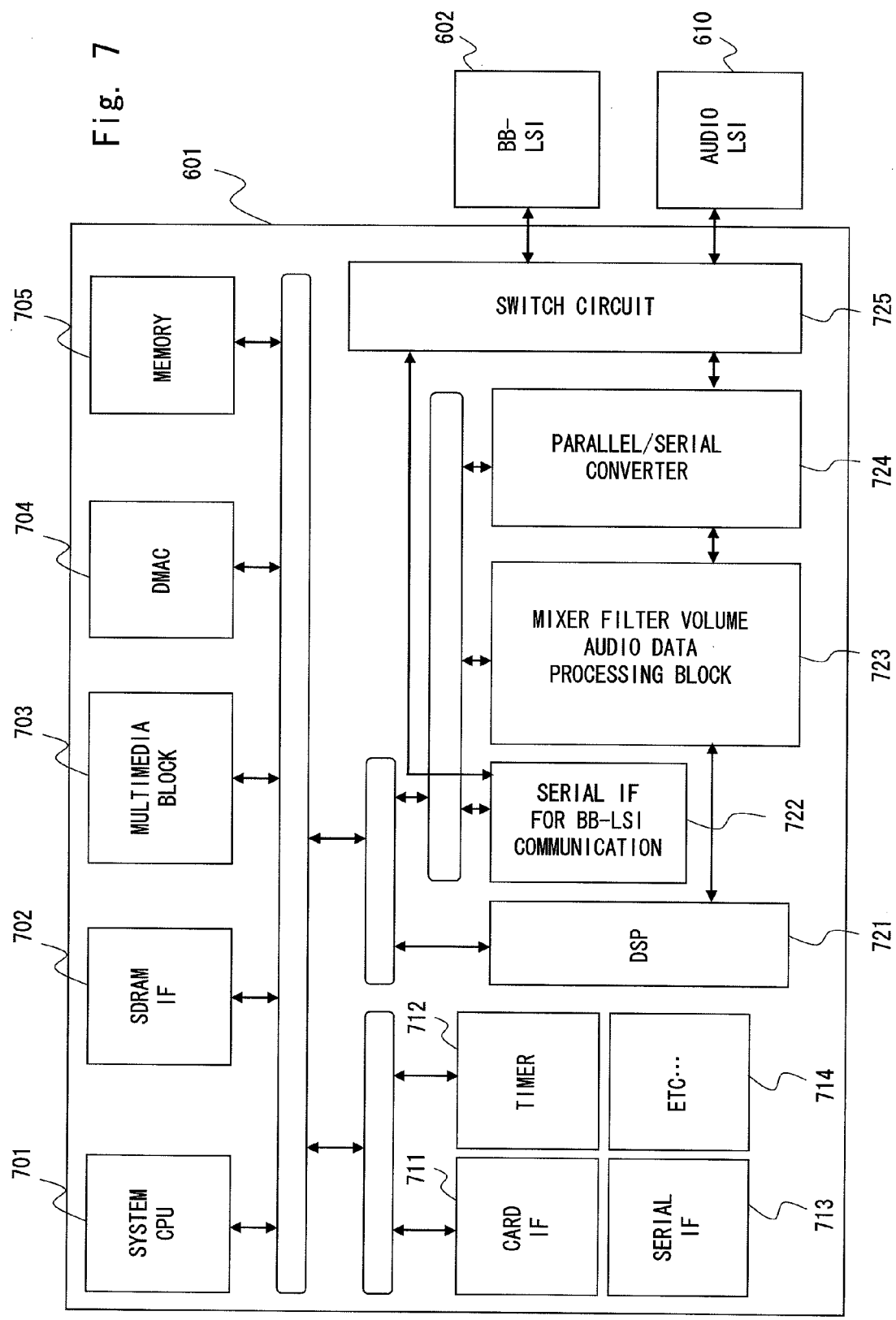
FIG. 7 is a block diagram showing a configuration example of an application LSI mounted on an electronic device.

In order to solve the problem stated above, the inventors of this application have found a configuration to commonly use the board in a simple manner. This configuration will be described hereinafter in detail. First, FIG. 7 shows a configuration example of the application LSI 601 according to this embodiment.

The application LSI 601 includes a system CPU (Central Processing Unit) 701, an SDRAM (Synchronous Dynamic Random Access Memory) interface 702, a multimedia block 703, a DMAC (Direct Memory Access Controller) 704, a memory 705, a card interface 711, a timer 712, a serial interface 713, other functional blocks 714, a DSP (Digital Signal Processor) 721, a serial interface 722 for baseband LSI communication, an audio data processing block 723, a parallel serial converter 724, and a switch circuit 725. These components are connected by buses. This application LSI 601 may be used in both of the A-vocoder system and the C-vocoder system.

The system CPU 701 controls each block arranged in the application LSI 601, and the battery 605, the power IC 606, the camera unit 608, the operation input unit 609, the display unit 607, the audio LSI 610, the microphone 611, the speaker 612 and the like shown in FIG. 2. That is, the application LSI 601 controls the whole system. Further, the application LSI 601 controls various applications including video reproduction, music reproduction, 2D/3D graphic processing, cameras, SD card control, power supply control, memories, input/output, and displays, for example. Thus, processing according to the application is executed.

The SDRAM interface 702 is an interface with an SDRAM installed in the electronic device 600. The multimedia block 703 performs a multimedia function, e.g., image reproduction and music reproduction. The DMAC 704 controls direct memory access. The memory 705 stores control programs, various settings and the like required to operate the application LSI 601.

The card interface 711 is an interface with a card. The serial interface 713 is an interface in a serial communication. The DSP 721 performs predetermined data processing (vocoding) on digital audio data. For example, the DSP 721 converts the AMR data into the PCM data depending on its application. The DSP 721 executes effect processing including sampling rate conversion, noise cancelling, and echo cancelling on the converted PCM data.

The serial interface 722 for baseband LSI communication is an interface for performing serial communication with the baseband LSI 602. That is, the serial interface 722 transmits data to the baseband LSI 602 and receives data from the baseband LSI 602. The audio data processing block 723 performs mixer processing, filter processing, volume adjustment processing and the like on the audio data. The DSP 721 and the audio data processing block 723 are blocks for performing the vocoder. The parallel serial converter 724 performs processing for converting the parallel data and the serial data.

The switch circuit 725 is one of the features of the application LSI 601 according to this embodiment, and is a switch circuit that performs switching processing. The data transmission between the application LSI 601 and the baseband LSI 602 is performed through the switch circuit 725. In the similar way, the data transmission between the application LSI 601 and the audio LSI 610 is performed through the switch circuit 725. The switch circuit 725 switches connection to the baseband LSI 602 and the connection to the audio LSI 610. In short, the switch circuit 725 installed in the application LSI connects the data path between the audio LSI 610 and the baseband LSI 602.

Figure 8:
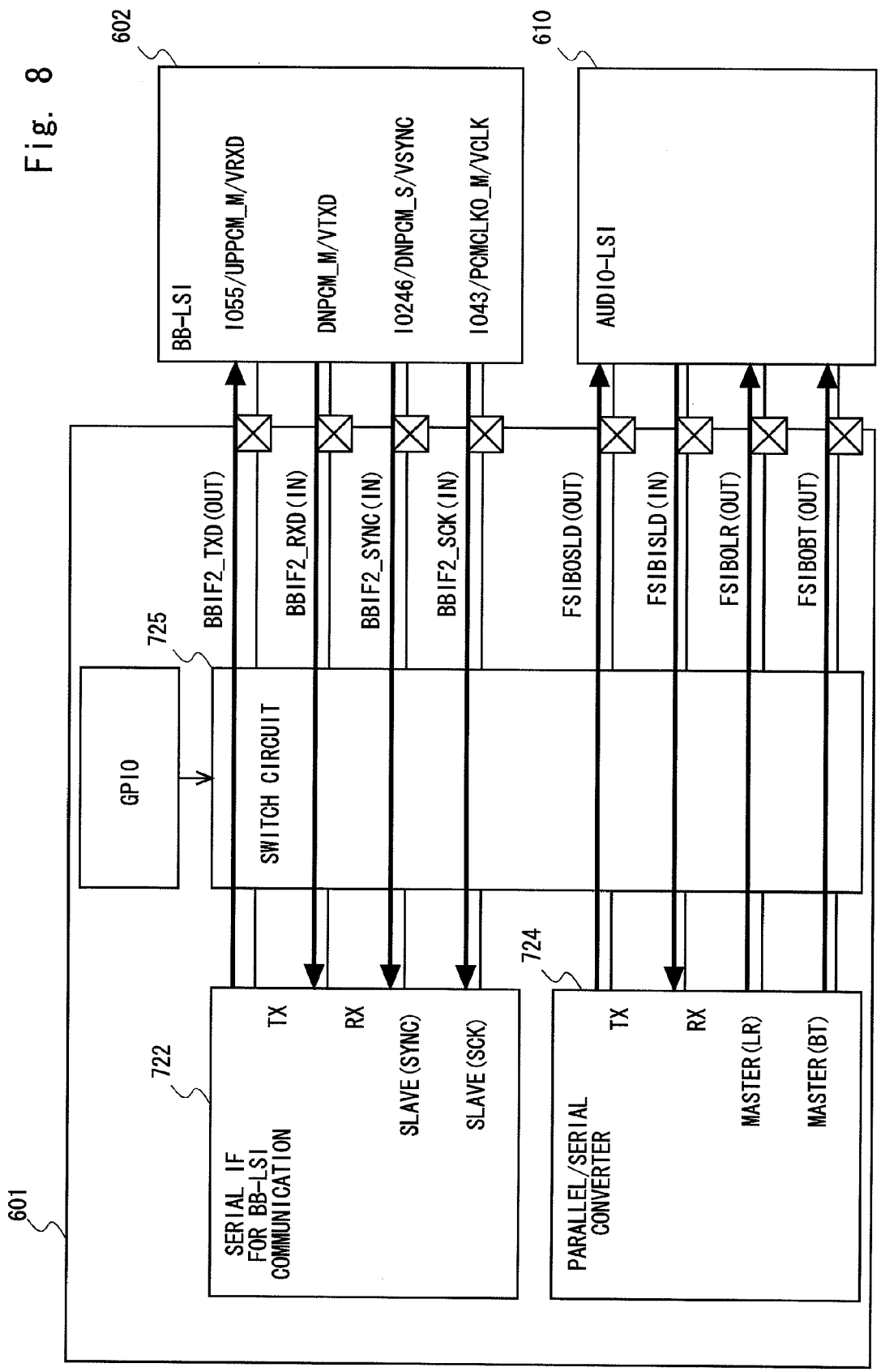
FIG. 8 is a diagram showing data paths among a baseband LSI, an application LSI, and an audio LSI.
Figure 9:
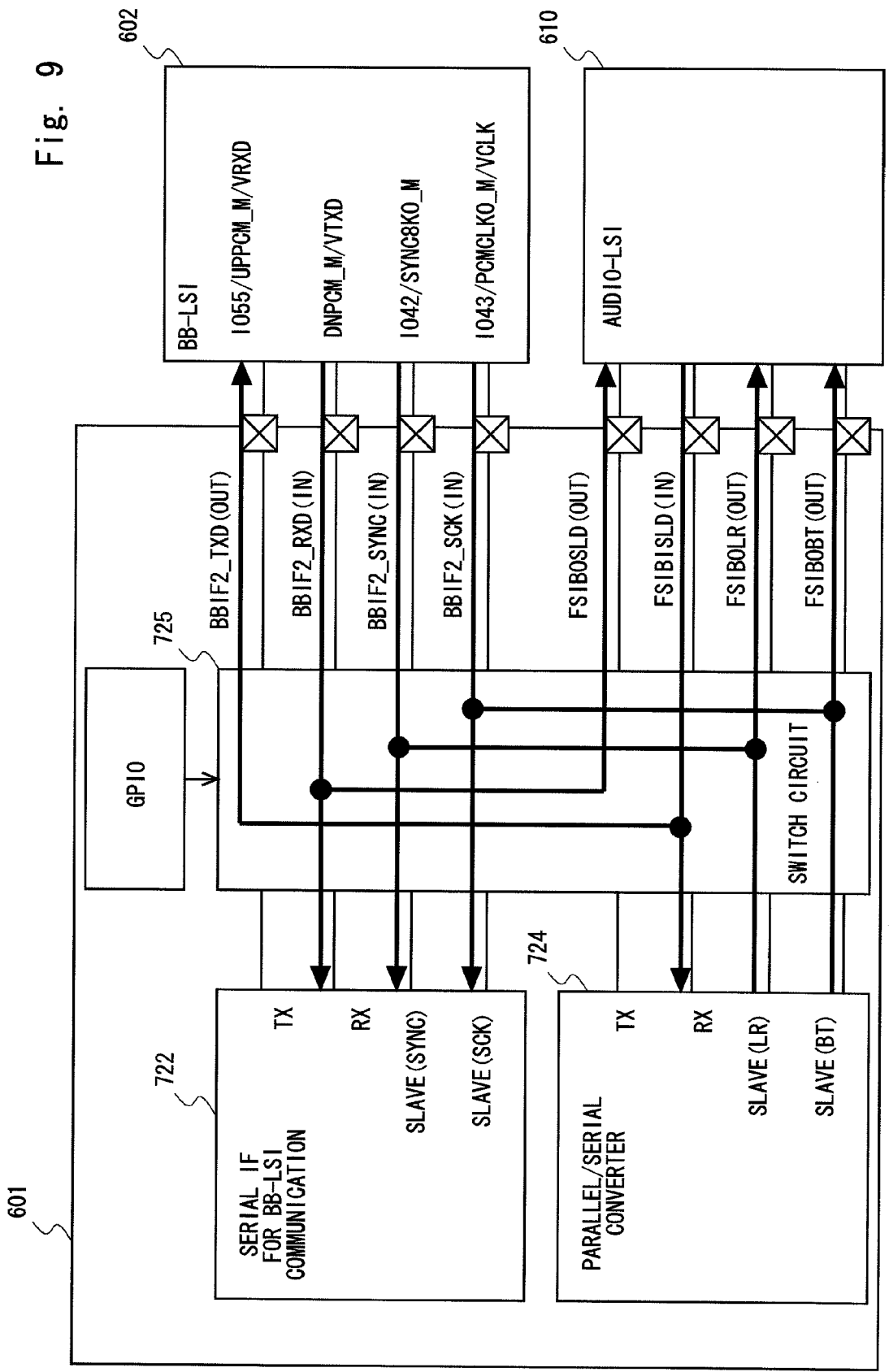
FIG. 9 is a diagram showing data paths among the baseband LSI, the application LSI, and the audio LSI.
Figure 10:
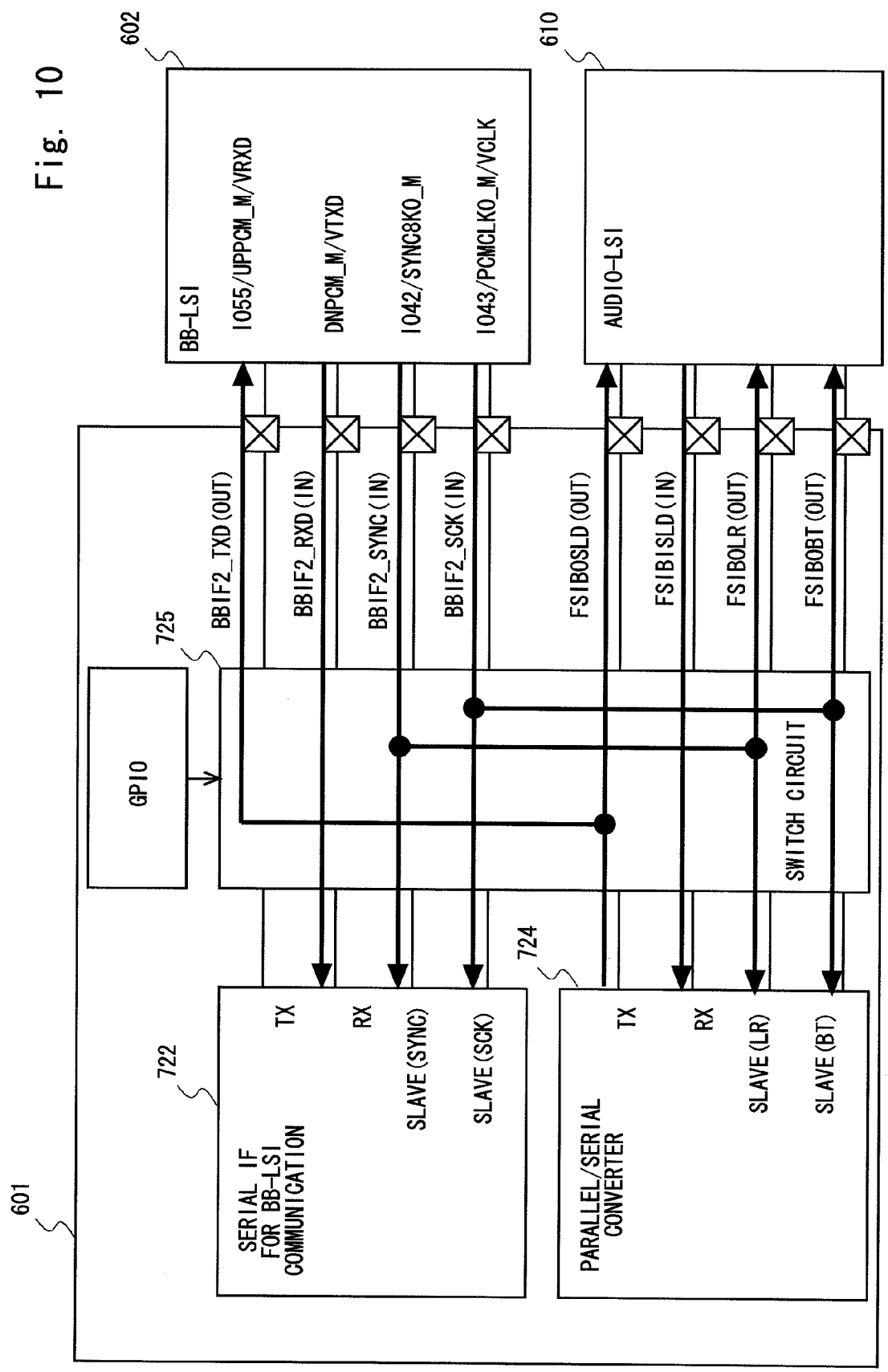
FIG. 10 is a diagram showing data paths among the baseband LSI, the application LSI, and the audio LSI.

Now, with reference to FIGS. 8 to 10, the data flow among the baseband LSI 602, the application LSI 601, and the audio LSI 610 will be described. FIG. 8 is a diagram showing a data flow when all the vocoder processing is performed in the application LSI 601. FIG. 9 is a diagram showing a data flow when telephone call or recording is performed. FIG. 10 is a diagram showing a data flow when guidance reproduction is performed which does not involve telephone call. Further, FIGS. 8 to 10 all show the C-vocoder system.

In FIGS. 8 to 10, BBIF2_TXD indicates a data terminal for uplink, BBIF2_RXD indicates a data terminal for downlink, BBIF2_SYNC indicates a sync terminal for PCM communication, BBIF2_SCK indicates a bit clock terminal for PCM communication, FSIBOSLD indicates a data terminal for downlink, FSIBISLD indicates a data terminal for uplink, FSIBOLR indicates a sync terminal for PCM communication, and FSIBOBT indicates a bit clock terminal for PCM communication.

As shown in FIGS. 8 to 10, the switch circuit 725 is included in the application LSI 601. The switch circuit 725 is controlled by GPIO output from the system CPU 701. Thus, the GPIO output from the system CPU 701 serves as a control signal for switching the switch operation by the switch circuit 725.

When the application LSI 601 performs all the vocoder processing, as shown in FIG. 8, the audio data (e.g., AMR data) from the baseband LSI 602 is transmitted to the serial interface 722 through the switch circuit 725. Then, the audio data input to the serial interface 722 is decoded by the DSP 721 of the application LSI 601. Then, the audio data (e.g., PCM data) that is decoded is output to the audio LSI 610. The audio LSI 610 D/A converts the input audio data, and outputs the converted data to the speaker 612.

Further, the voice detected by the microphone 611 is converted into the digital signal (e.g., PCM data) by the audio LSI 610. Then, the audio data from the audio LSI 610 is input to the application LSI 601. The DSP 721 or the like of the application LSI 601 performs decoding and effect processing on the input audio data. Then, the decoded audio data is output to the baseband LSI 602 through the switch circuit 725. In this way, when the vocoder is not executed by the baseband LSI 602, the switch circuit 725 operates so that data communication is not performed between the baseband LSI 602 and the audio LSI 610. Thus, the data path between the baseband LSI 602 and the audio LSI 610 is interrupted. Accordingly, data communication is performed between the baseband LSI 602 and the audio LSI 610 through the processing of the application LSI 601.

When telephone call or recording is executed, as shown in FIG. 9, the digital data from the audio LSI 610 is sent to the baseband LSI 602 and the application LSI 601. The application LSI 601 executes vocoder processing required for recording. Specifically, the DSP 721 decodes the audio data input from the audio LSI 610. The application LSI 601 stores the decoded audio data in the SDRAM or the memory 705 of the NOR flash. On the other hand, when telephone call is made, the audio data from the audio LSI 610 is encoded by the baseband LSI 602. That is, the baseband LSI 602 performs vocoder processing required to perform telephone call. The audio data from the baseband LSI 602 is sent to the RF subsystem 603, and telephone call is performed. Further, the audio data received by the RF subsystem 603 is decoded by the baseband LSI 602. The audio data decoded by the baseband LSI 602 is sent to the audio LSI 610. The audio LSI 610 D/A converts the audio data to output the converted data to the speaker 612. The speaker 612 reproduces the voice.

Further, when guidance such as an answering machine message is reproduced, as shown in FIG. 10, the audio data output from the application LSI 601 is input to the baseband LSI 602 and the audio LSI 610. Then, the baseband LSI 602 performs vocoder to encode the audio data. The audio data output from the baseband LSI 602 is input to the application LSI 601. The data output from the audio LSI 610 is input to the application LSI 601. In this way, when the C-vocoder is executed, the switch circuit 725 is operated so that data communication is performed between the baseband LSI 602 and the audio LSI 610 according to the function that is used.

As described above, when the vocoder processing is performed by the baseband LSI 602, as shown in FIGS. 9 and 10, the switch circuit 725 switches the data path so that data communication is performed between the baseband LSI 602 and the audio LSI 610. In this state, the data output from the baseband LSI 602 is directly sent to the audio LSI 610 through the switch circuit 725, and the data output from the audio LSI 610 is directly sent to the baseband LSI 602 through the switch circuit 725.

On the other hand, when the application LSI 601 performs all the vocoder processing, as shown in FIG. 8, the switch circuit 725 switches the data path so that data communication is not performed between the baseband LSI 602 and the audio LSI 610. In this case, the data output from the baseband LSI 602 to the application LSI 601 is subjected to vocoder processing by the DSP 721 and the audio data processing block 723, and then output to the audio LSI 610. Further, the data output from the audio LSI 610 to the application LSI 601 is subjected to vocoder processing by the DSP 721 and the audio data processing block 723, and then output to the baseband LSI 602.

As described above, the switch circuit 725 that switches the data path is provided in the application LSI 601. Accordingly, the board 630 can be commonly used by the A-vocoder system and the C-vocoder system. In short, the application LSI 601 may be mounted on the same board 630 in both systems. For example, when the application LSI 601 is mounted on the C-vocoder system of the method 2 which requires switch of the data path, switching is performed according to the scene, as shown in FIGS. 8 to 10.

When only the application LSI 601 executes vocoding, the switch circuit 725 interrupts the data path between the audio LSI 610 and the baseband LSI 602. When the baseband LSI 602 executes vocoding, the switch circuit 725 connects the data path between the audio LSI 610 and the baseband LSI 602. The switch circuit 725 operates to switch the data path according to the element of the vocoding that is executed. The operation of the switch circuit 725 is controlled by the GPIO output from the system CPU 701.

On the other hand, when the application LSI 601 is installed in the A-vocoder system, there is no case that the baseband LSI 602 executes vocoder. Thus, the baseband LSI 602 and the audio LSI 610 may be always separated from each other. In short, when the application LSI 601 is installed in the A-vocoder system, the switch circuit 725 always interrupts the data path between the audio LSI 610 and the baseband LSI 602. The data path in this case is similar to that shown in FIG. 8.

According to this configuration, there is no need to mount a logic circuit that switches the data path on the board 630. Accordingly, it is possible to commonly use the board 630. In short, there is no need to newly design different boards 630 for the A-vocoder and the C-vocoder. Further, it is possible to reduce the number of elements mounted on the board 630, thereby being able to reduce manufacturing cost and achieve compactness.

Further, it may be possible that different baseband LSIs 602 are used and the elements of the vocoder to be executed in the baseband LSIs 602 are different depending on the type of the mobile phone. Since different controls are required depending on the baseband LSI 602 to be used, it is difficult to commonly use the switch circuit. However, by including the switch circuit 725 in the application LSI 601 as in this embodiment, the board 630 can be commonly used.

In particular, it is possible to commonly use the board 603, which is required in the transition period from the C-vocoder to the A-vocoder. Further, depending on the type of the mobile phone, the application LSI 601 and the baseband LSI 602 may be manufactured by different manufacturers of semiconductor devices. In this case, it is desired for the manufacturer of the audio LSIs 610 to manufacture the application LSIs 601 that can be used in any type of baseband LSIs 602. When the baseband LSI 602 executes vocoder, parameters of noise cancelling, echo cancelling, and the like are the technical know-how, and manufactures of the baseband LSIs 602 and mobile phones do not want to disclose them. Even in such a case, it is possible to use the baseband LSI 602 without any modification in design by using the application LSI 601 according to this embodiment. In short, it is possible to commonly use the board 630 and the application LSI 601 regardless of the type of the baseband LSI 602, thereby improving convenience.

Further, since the application LSI 601 executes vocoding, voice quality can be improved. More specifically, since the application LSI 601 having higher processing ability than the baseband LSI 602 executes vocoding, it is possible to achieve high-load processing, thereby being able to remove noise or echo more efficiently. Thus, voice quality can be improved. For example, in the case of high-end mobile phones, higher-load processing needs to be performed. In this case, it is possible to cause the application LSI 601 with high processing ability to execute the processing. Further, in the case of low-end mobile phones, the load is not high, and thus the baseband LSI 602 may perform a part of the vocoder processing.

Figure 11:
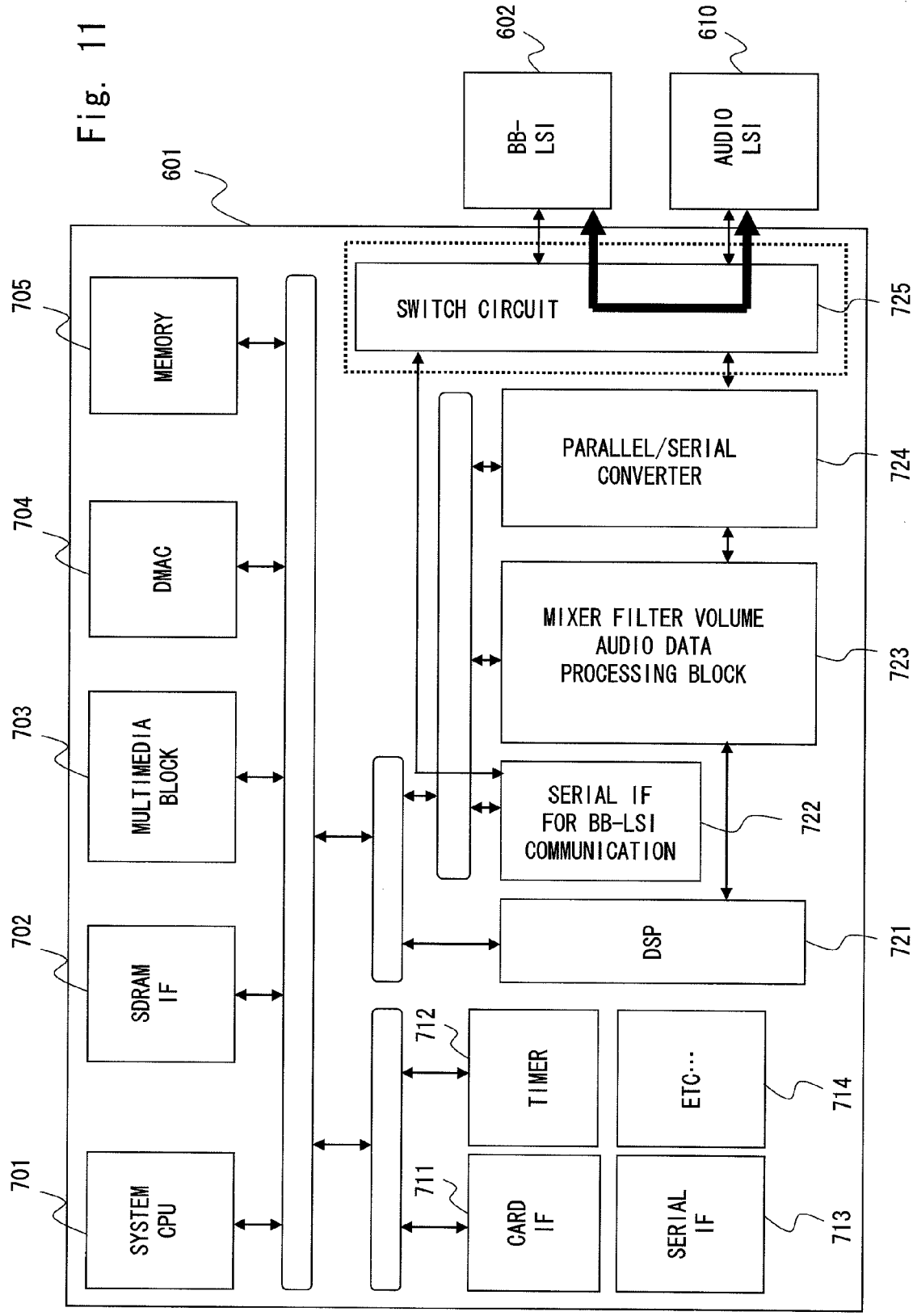
FIG. 11 is a diagram schematically showing data flow and power supply in an application LSI 601.
Figure 12:
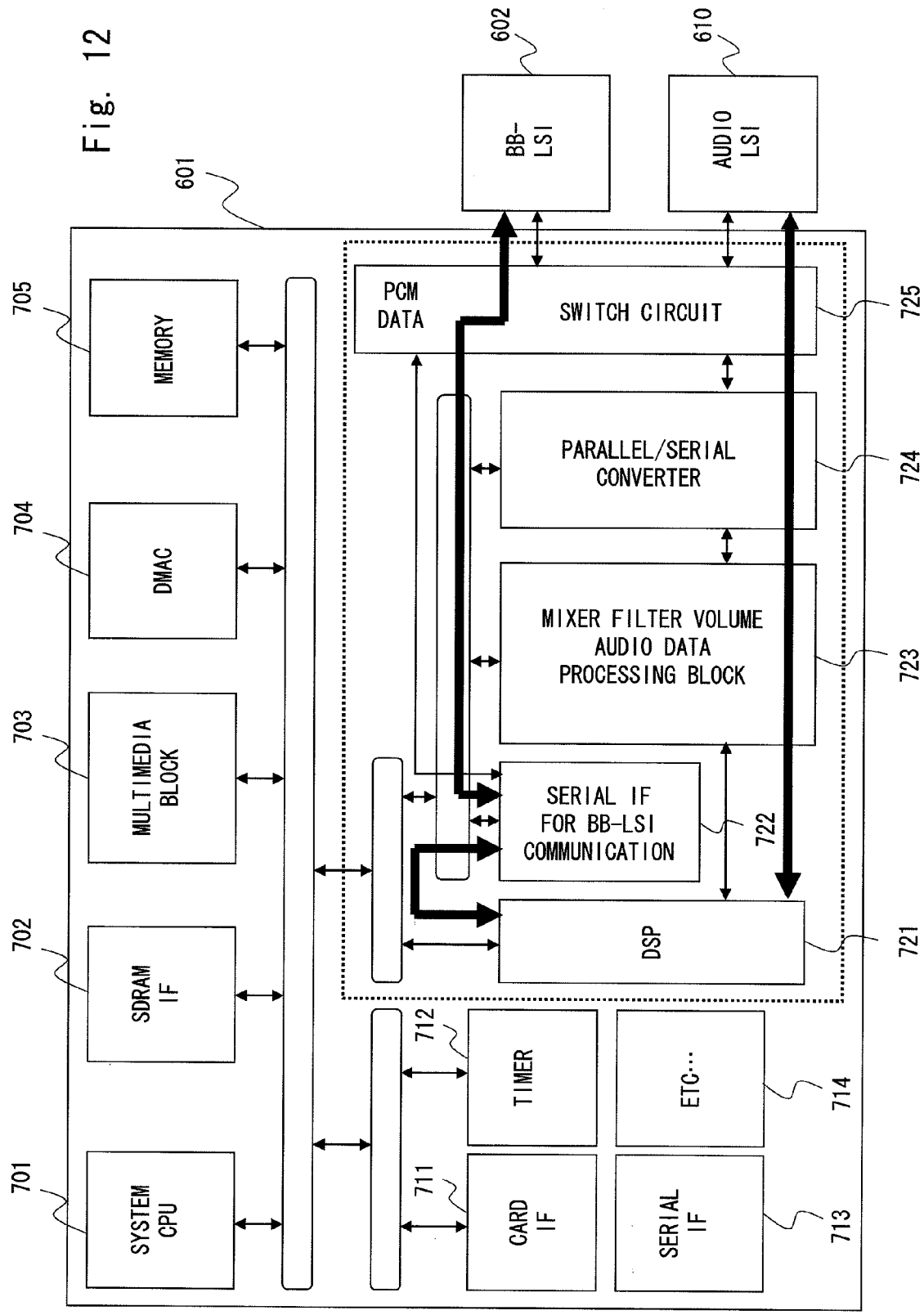
FIG. 12 is a diagram schematically showing data flow and power supply in the application LSI 601.
Figure 13:
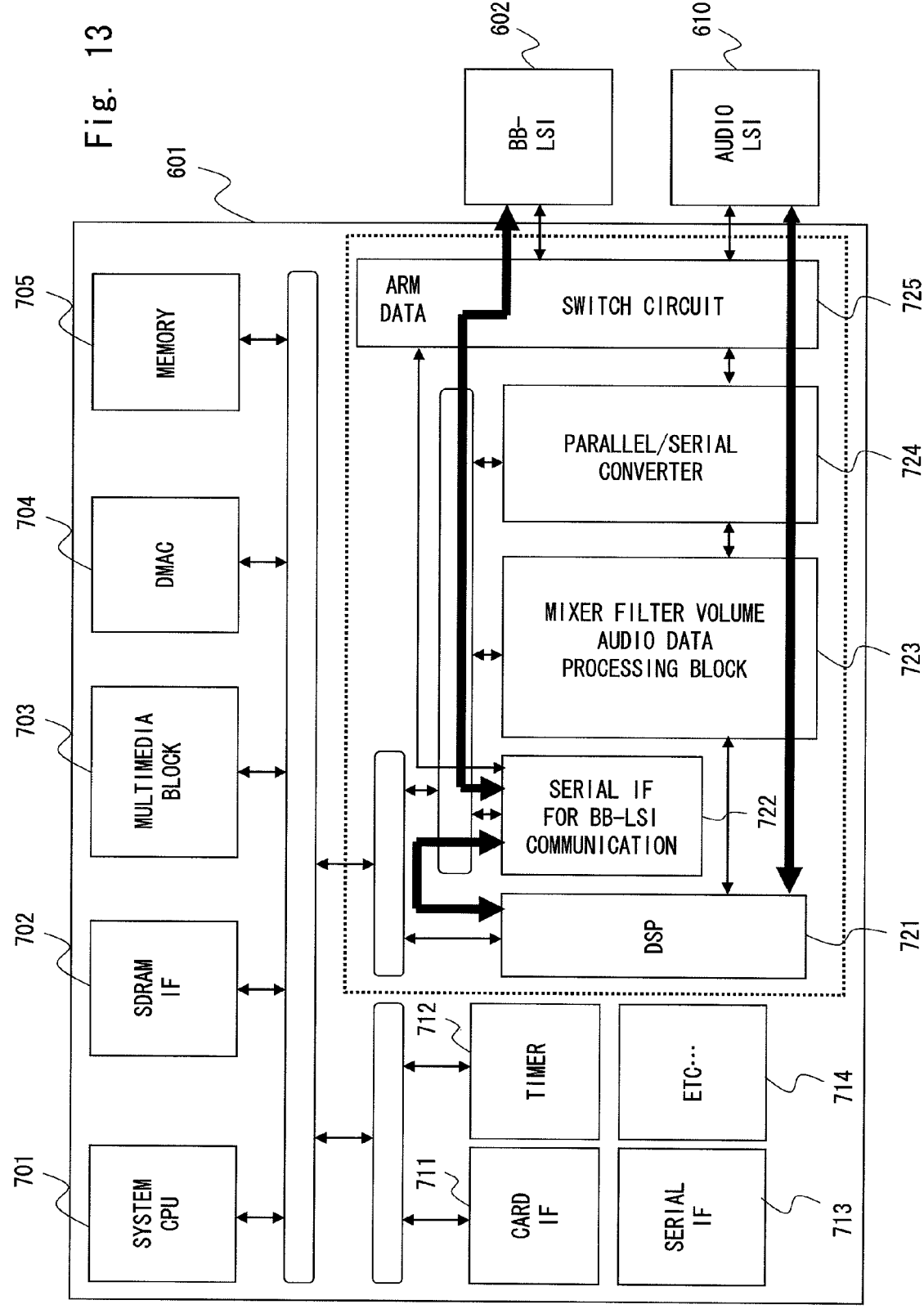
FIG. 13 is a diagram schematically showing data flow and power supply in the application LSI 601.

Further, by stopping power supply to a part of the blocks according to the processing, power consumption can be reduced. This point will be described below with reference to FIGS. 11 to 13. FIGS. 11 to 13 are drawings schematically showing a data flow in the application LSI 601, and the blocks to which power is supplied are surrounded by a dotted line. In other words, power supply to each block outside the dotted frame is stopped.

When only the baseband LSI 602 performs vocoding in the C-vocoder system, power may be supplied only to the switch circuit 725 as shown in FIG. 11. That is, since processing is not performed in the application LSI 601, it is possible to stop power supply to almost all the blocks of the application LSI 601. Thus, power consumption can be reduced. In this case, the PCM data is generated by the baseband LSI 602. Then, the PCM data communication is performed between the baseband LSI 602 and the audio LSI 610 through the switch circuit 725 included in the application LSI 601. As a matter of course, the process of the PCM data (noise cancelling and the like) may be performed in the baseband LSI 602.

On the other hand, when the application LSI 601 executes vocoding, power may be supplied only to the blocks required to perform the processing. For example, as shown in FIG. 12, power is supplied only to the area surrounded by the dotted line. FIG. 12 shows an example in which the application LSI 601 installed in the C-vocoder system performs effect processing. In this way, power supply to a part of the blocks in the application LSI 601 can be stopped, thereby being able to reduce power consumption. Specifically, power is supplied to the DSP 721, the serial interface 722, the audio data processing block 723, the parallel serial converter 724, and the switch circuit 725, and power supply to the other blocks including the system CPU 701 is stopped. In this way, power consumption can be reduced.

Note that, in FIG. 12, the baseband LSI 602 decodes audio data to convert the audio data into PCM data. At this time, the switch circuit 725 interrupts the data path between the baseband LSI 602 and the audio LSI 610. The application LSI 601 transmits data to the baseband LSI 602 or receives data from the baseband LSI 602. The serial interface 722 serves as an interface of data transmission to the baseband LSI 602 and data reception from the baseband LSI 602. The baseband LSI 602 converts the AMR data into the PCM data. Then, the DSP 721 of the application LSI 601 processes the PCM data. The DSP 721 performs sampling rate conversion, noise cancelling, and echo cancelling, for example. The audio data on which effect processing is performed is output to the audio LSI 610 through the switch circuit 725.

On the other hand, the PCM data from the audio LSI 610 is output to the application LSI 601. The DSP 721 of the application LSI 601 processes the PCM data. The PCM data that is processed is output to the baseband LSI 602 using the serial interface 722 as an interface. Then the baseband LSI 602 encodes the PCM data.

FIG. 13 is a diagram showing a data flow of the application LSI 601 installed in the A-vocoder system. In the A-vocoder system, the application LSI 601 executes all the elements of vocoding, which means the baseband LSI 602 does not execute vocoding. Thus, the baseband LSI 602 outputs the audio data (hereinafter referred to as AMR data) that is encoded to the application LSI 601. At this time, the switch circuit 725 interrupts the data path between the baseband LSI 602 and the audio LSI 610. The serial interface 722 serves as an interface of data transmission to the baseband LSI 602 and data reception from the baseband LSI 602.

Then, the DSP 721 of the application LSI 601 decodes the AMR data to the PCM data. Further, the DSP 721 executes the process of the PCM data, e.g., vocoding such as sampling rate conversion, noise cancelling. Then, the application LSI 601 outputs the audio data to the audio LSI 610 through the switch circuit 725.

In FIGS. 12 and 13, power is supplied only to the blocks surrounded by the dotted line. In short, power supply to the blocks which do not have a relation with vocoding is stopped. In this way, a part of power supply is stopped depending on the vocoding that is executed. In short, power supply to a part of the application LSI 601 is stopped depending on the connection state of the data path. Accordingly, it is possible to operate only the blocks which are required for the processing, thereby being able to reduce power consumption. For example, when the vocoder is executed, power supply to the blocks which are not required for the vocoder is stopped, thereby being able to reduce power consumption.

When the switch circuit 725 performs the switching operation, the system CPU 701 is turned on, and the system CPU 701 executes switch processing of the switch circuit 725. After the switching processing is completed, power supply to the system CPU 701 is stopped. When the switching is required again, the system CPU 701 executes switch processing of the switch after power supply to the system CPU 701 is restarted.

Figure 14:
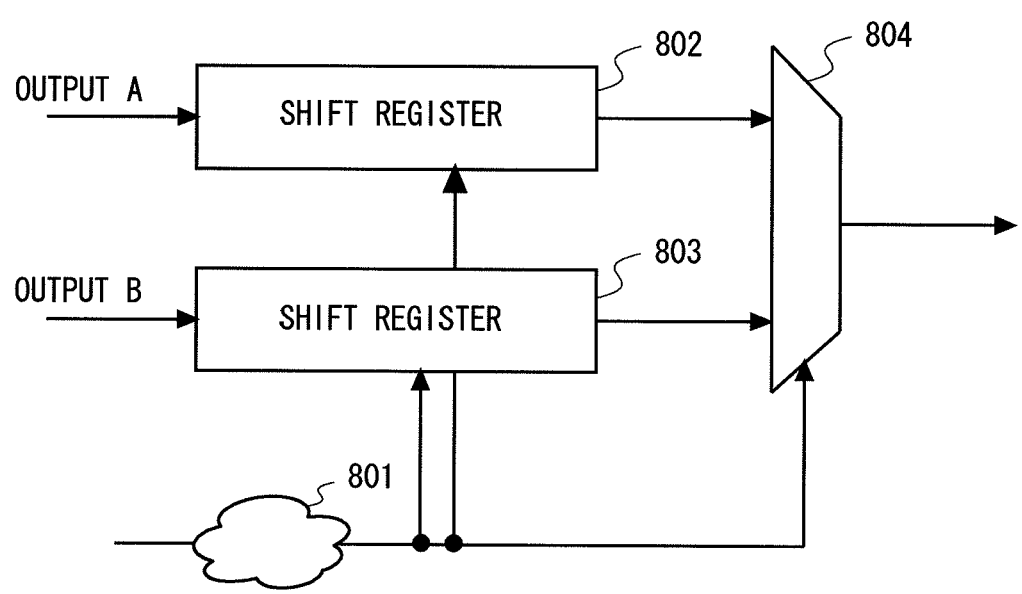
FIG. 14 is a diagram schematically showing a configuration example of a mute circuit.

Further, since the control is intensively performed in the application LSI 601, it is possible to easily switch the path. Further, in order to avoid noise due to the switch of the path, the application LSI 601 may have a mute function. FIG. 14 shows a configuration example of a mute circuit installed in the application LSI 601. The mute circuit includes a frequency divider 801, a shift register 802, a shift register 803, and a selector 804, and is installed inside the application LSI 601.

For example, the frequency divider 801 generates a SYNC signal of a predetermined frequency (8 kHz). The shift registers 802 and 803 shift the audio data to a lower-order bit in synchronization with the SYNC signal. For example, in the case of 16-bit audio data, only the higher-order bit is audible and the lower-order bit is not audible for people. Accordingly, the mute function can be achieved by shifting the audio data to the lower-order bit.

As shown in FIG. 14, when the data of the output A is switched to the data of the output B while the voice call is made, noise is generated. In order to reduce the noise, the data of the output A and the output B are temporarily muted before and after the data is switched, and the selector 804 switches the data in the silent state. After the data is switched, the shift registers 802 and 803 execute processing to increase the volume to the original audio level.

The mute circuit operates when the switch circuit 725 performs the switching operation. The system CPU 701 mutes the voice reproduced from the speaker 612 according to the timing that the switch circuit 725 performs switching. For example, the control is performed in such a way that the voice is not reproduced in a period in which switching is performed in the application LSI 601, and the mute state is cancelled upon completion of the switching. The control of the mute function is performed by the control signal output from the system CPU 701 as is similar to the GPIO that switches the switch circuit 725.

In this way, it is possible to efficiently remove the noise with a simple configuration. Further, the switch circuit 725 that performs switching is installed in the application LSI 601 and the mute circuit is installed in the application LSI 601, whereby it is possible to perform control in a simple manner. In short, it is not required to output the signal that controls the mute state from the application LSI 601 to the baseband LSI 602, whereby it is possible to perform control inside the application LSI in a simple manner.

The present invention is not limited to the embodiments stated above, but may be changed as appropriate without departing from the spirit of the present invention.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A communication terminal, comprising:
   a baseband processor unit that performs baseband processing for communication;
   an application processor unit, including a central processing unit and a switch circuit, that includes a vocoder function and performs processing according to an application; and
   an audio processor unit that performs at least one of D/A conversion and A/D conversion on audio data,
   wherein the switch circuit selectively disconnects a data path between the audio processor unit and the baseband processor unit when only the application processor unit executes vocoding.

2. The communication terminal according to claim 1, wherein
   when the baseband processor unit executes vocoding, the switch circuit connects the data path between the audio processor unit and the baseband processor unit.

3. The communication terminal according to claim 1, wherein power supply to the central processing unit of the application processor unit is stopped depending on a connection state of the data path.

4. The communication terminal according to claim 1, further comprising a speaker that reproduces audio data that is D/A converted by the audio processor unit,
   wherein the application processor unit mutes voice that is reproduced from the speaker according to a timing of switching by the switch circuit.

5. A semiconductor device installed in a communication terminal on which a baseband processor unit and an audio processor unit are mounted, the baseband processor unit performing baseband processing for communication, and the audio processor unit performing at least one of D/A conversion and A/D conversion on audio data, the semiconductor device comprising:
   a processor that executes vocoding on the audio data from the audio processor unit; and
   a switch circuit that selectively disconnects a data path between the audio processor unit and the baseband processor unit when only the semiconductor device executes vocoding.

6. The semiconductor device according to claim 5, wherein the switch circuit is controlled to connect the data path between the audio processor unit and the baseband processor unit when the baseband processor unit executes vocoding.

7. The semiconductor device according to claim 5, wherein power supply to the processor is stopped depending on a connection state of the data path.

8. The semiconductor device according to claim 5, wherein the semiconductor device performs control to mute voice that is reproduced according to a timing of switching by the switch circuit.

9. A method of controlling a communication terminal, the communication terminal comprising:
- a baseband processor unit that performs baseband processing for communication;
- an application processor unit, including a central processing unit and a switch circuit, that includes a vocoder function and performs processing according to an application; and
- an audio processor unit that performs at least one of D/A conversion and A/D conversion on audio data, the method comprising:
- selectively disconnecting, using the switch circuit, a data path between the audio processor unit and the baseband processor unit when vocoding is not executed by the baseband processor unit; and
- executing the vocoding by the baseband processor unit.

10. The method of controlling the communication terminal according to claim 9, comprising:
- when only the application processor unit executes vocoding, the switch circuit interrupts the data path between the audio processor unit and the baseband processor unit, and
- when the baseband processor unit executes vocoding, the switch circuit connects the data path between the audio processor unit and the baseband processor unit.

11. The method of controlling the communication terminal according to claim 9, wherein power supply to the central processing unit is stopped depending on a connection state of the data path.

12. The method of controlling the communication terminal according to claim 9, wherein the application processor unit performs control to mute voice that is reproduced according to a timing of switching by the switch circuit.

13. The communication terminal according to claim 1, wherein the application processor unit includes a plurality of functional blocks, and power supply to at least one functional block is stopped depending on a connection state of the data path.

14. The communication terminal according to claim 13, wherein power supply to functional blocks not related to vocoding is stopped depending on a connection state of the data path.

15. The semiconductor device according to claim 5, further comprising a plurality of functional blocks, wherein power supply to at least one functional block is stopped depending on a connection state of the data path.

16. The semiconductor device according to claim 15, wherein power supply to functional blocks not related to vocoding is stopped depending on a connection state of the data path.

17. The method according to claim 9, wherein the application processor unit includes a plurality of functional blocks, and the method further comprises stopping power supply to at least one functional block depending on a connection state of the data path.

18. The method according to claim 17, further comprising stopping power supply to functional blocks not related to vocoding depending on a connection state of the data path.

* * * * *